(12) United States Patent
Smith, III

(10) Patent No.: US 6,631,734 B2
(45) Date of Patent: Oct. 14, 2003

(54) DUMMY UNDERSEA HYDRAULIC COUPLING MEMBER

(75) Inventor: Robert E. Smith, III, Missouri City, TX (US)

(73) Assignee: National Coupling Co., Inc., Stafford, TX (US)

(*) Notice: Subject to any disclaimer, the term of this patent is extended or adjusted under 35 U.S.C. 154(b) by 200 days.

(21) Appl. No.: 09/863,154

(22) Filed: May 22, 2001

(65) Prior Publication Data

US 2002/0174990 A1 Nov. 28, 2002

(51) Int. Cl.[7] .................................. F16L 37/28
(52) U.S. Cl. .................... 137/614.2; 137/538
(58) Field of Search ................ 137/538, 540, 137/515.3, 515.5, 614.2, 535, 613, 614; 251/149.1, 149.6

(56) References Cited

U.S. PATENT DOCUMENTS

| | | | |
|---|---|---|---|
| 2,320,339 A | 6/1943 | Buttner | |
| 2,471,237 A | 5/1949 | Pasturczak | |
| 2,599,935 A | 6/1952 | Paskar | |
| 2,645,450 A | 7/1953 | Chessman | |
| 2,727,759 A | 12/1955 | Elliott | |
| 2,727,761 A | 12/1955 | Elliott et al. | |
| 2,772,898 A | 12/1956 | Seeler | |
| 3,006,364 A | * 10/1961 | Osborn | 137/538 X |
| 3,291,152 A | 12/1966 | Comer | |
| 3,366,138 A | * 1/1968 | Graham | 137/538 X |
| 3,551,005 A | 12/1970 | Brun | |
| 4,214,607 A | 7/1980 | Bouteille | |
| 4,453,566 A | 6/1984 | Henderson, Jr. et al. | |
| 4,506,863 A | 3/1985 | Quin et al. | |
| 4,597,413 A | 7/1986 | Buseth | |
| 4,637,470 A | 1/1987 | Weathers et al. | |
| 4,694,859 A | 9/1987 | Smith, III | |
| 4,703,774 A | 11/1987 | Seehausen | |
| 4,709,726 A | 12/1987 | Fitzgibbons | |
| 4,754,780 A | 7/1988 | Smith, III | |
| 4,768,538 A | 9/1988 | Mintz et al. | |
| 4,813,454 A | 3/1989 | Smith, III | |
| 4,832,080 A | 5/1989 | Smith, III | |
| 4,834,139 A | 5/1989 | Fitzgibbons | |
| 4,924,902 A | 5/1990 | Lewis et al. | |
| 4,924,909 A | 5/1990 | Wilcox | |
| 5,063,965 A | 11/1991 | Wilcox | |
| 5,099,882 A | 3/1992 | Smith, III | |
| 5,203,374 A | 4/1993 | Smith, III | |
| 5,232,021 A | 8/1993 | Smith | |
| 5,343,891 A | 9/1994 | Bosley | |
| 5,360,035 A | 11/1994 | Smith | |
| 5,368,070 A | 11/1994 | Bosley | |
| 5,390,702 A | 2/1995 | Smith, III | |
| 5,406,980 A | 4/1995 | Allread et al. | |
| 5,692,538 A | 12/1997 | Smith, III | |
| 5,762,106 A | 6/1998 | Smith, III | |
| 6,085,785 A | 7/2000 | Smith, III | |
| 6,123,103 A | 9/2000 | Smith, III. | |

(List continued on next page.)

FOREIGN PATENT DOCUMENTS

| | | | |
|---|---|---|---|
| GB | 2 131 510 | 12/1982 | ............ F16L/58/00 |
| GB | 2 143 604 | 3/1984 | ............ F16L/55/24 |
| GB | 2 173 562 | 4/1986 | ............ F16L/55/24 |
| GB | 2 248 281 | 3/1991 | ............ F16L/17/03 |
| GB | 2 293 423 | 9/1995 | ............ F16L/37/28 |
| GB | 2 348 936 | 9/1999 | ............ F16L/29/04 |

*Primary Examiner*—Kevin Lee
(74) *Attorney, Agent, or Firm*—Wong, Cabello, Lutsch, Rutherford & Brucculeri, L.L.P.

(57) ABSTRACT

A dummy undersea hydraulic coupling member is disclosed for protecting an opposing undersea hydraulic coupling member when the hydraulic lines are not operating. The dummy undersea hydraulic coupling member has a water displacement expansion chamber with a piston therein that allows trapped water and/or air to move from the receiving chamber to the water displacement expansion chamber during connection of the dummy coupling member to the opposing coupling member.

6 Claims, 2 Drawing Sheets

U.S. PATENT DOCUMENTS

| | | |
|---|---|---|
| 6,202,690 B1 | 3/2001 | Smith, III |
| 6,206,040 B1 | 3/2001 | Smith, III |
| 6,227,245 B1 | 5/2001 | Smith, III |
| 6,283,444 B1 | 9/2001 | Smith, III |

* cited by examiner

DUMMY UNDERSEA HYDRAULIC COUPLING MEMBER

BACKGROUND OF THE INVENTION

1. Field of the Invention

This invention relates in general to hydraulic couplings, and specifically to hydraulic couplings used in undersea drilling and production applications. More particularly, this invention involves a dummy undersea hydraulic coupling member that is used for protecting an opposing coupling member that is stationed subsea.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Several couplings of this type are shown in patents owned by National Coupling Company, Inc. of Stafford, Tex.

In undersea drilling and production applications, the male member of the coupling may be connected to a manifold plate or other securement at a subsea location at the inside or outside of a well bore. In many cases, the male members are positioned so that the end or leading face of each member points vertically up from the sea floor. The female members, which also may be secured to a manifold plate, are moved into position over the male members and then lowered onto the male members by a diver or subsea vehicle, such as an ROV (remote operating vehicle). When the female members are positioned on the male members, hydraulic fluid flow typically is from the female member to the male member of each coupling. Typically, one or both of the coupling members have poppet valves.

Each poppet valve typically includes a conical valve face which seats, in the closed position, against a valve seat in the coupling member. The poppet valve opens to allow fluid flow, and closes against the valve seat within the bore to arrest the flow. Generally, the poppet valve is spring-biased to the closed position. The valve may include a valve actuator which may be a nose or stem extending from the apex of the valve face along the longitudinal axis of the poppet valve.

When the male and female coupling members are disconnected, the male coupling members typically remain subsea, and the female coupling members are retrieved. Frequently, well bores in which the couplings are positioned contain debris. The male member, which remains subsea when the coupling is disconnected, is subject to debris accumulating in exposed flow passages when it is disconnected from the female member. The debris may contaminate the hydraulic fluid or cause wear to the seals and sealing surfaces in the hydraulic couplings and hydraulic system. Additionally, the coupling members that remain subsea are subject to marine growth, sand, silt, and other mechanical impacts unless there is some form of protection.

To reduce or prevent damage to the coupling member remaining subsea, dummy coupling members have been used. A dummy coupling member mates with the opposing coupling member, but the dummy is not connected to hydraulic lines and therefore does not function to conduct hydraulic fluid through the system. Instead, the dummy coupling member protects the opposing coupling member when the hydraulic line through that coupling is not in use.

Typically, dummy undersea coupling members are the female coupling member because the male coupling member remains subsea. Dummy female coupling members may have one or more seals in a receiving chamber, and these seals engage the male member when the male member enters the receiving chamber. Dummy female coupling members also may have a bore and/or a vent passage extending between the receiving chamber and an outer surface of the dummy coupling member body. This allows trapped seawater and/or trapped air in the receiving chamber to escape out of the receiving chamber of the dummy coupling member when it engages the opposing coupling member. However, the bore or vent passage also may be subject to ingress of silt, debris, etc., with less effective protection of the opposing coupling member.

Unless the trapped seawater or air is allowed to escape from the receiving chamber, it may be very difficult or impossible to fully mate the dummy coupling to the opposing coupling member. Another undesirable consequence that may occur if trapped seawater or trapped air is not allowed to escape, is due to increased pressure that may force the poppet valve of the opposing coupling member open and allow the trapped seawater or trapped air to enter the hydraulic lines. Disconnecting the dummy coupling member from the opposing member also may be difficult due to hydraulic lock.

Thus, a dummy undersea hydraulic coupling member is needed to prevent debris and marine growth and other objects from damaging the coupling member remaining subsea, and which allows the dummy coupling member to be engaged and disengaged from the opposing member without resistance due to trapped seawater and/or trapped air.

U.S. Pat. No. 5,692,538 to Robert E. Smith III, assigned to National Coupling Company, Inc., does not show a dummy coupling member, but shows an undersea hydraulic coupling member having angled flow passages in the body of the male member to help prevent ingress of debris. When the female member is attached to the male member, hydraulic pressure through the angled flow ports and against the face of the poppet valve urges the poppet valve of the male member open to allow fluid to flow between the coupling members. The poppet valve in combination with the angled flow ports in the male member body help prevent ingress of debris, while allowing trapped hydraulic fluid pressure to bleed off when the coupling members are disconnected.

SUMMARY OF THE INVENTION

The present invention resides in a dummy undersea hydraulic coupling member having a water displacement expansion chamber and a piston for varying the volume of the water displacement expansion chamber in response to the pressures acting on the opposing faces of the piston. When the dummy coupling member is connected to an opposing coupling member subsea, seawater and/or air in the receiving chamber of the dummy is displaced by the opposing coupling member. That seawater and/or air enters the water displacement expansion chamber, and the piston allows the volume of that chamber to increase as a result of pressure from displaced seawater and/or air acting on the front face of the piston until the chamber reaches the volume required for a pressure equilibrium.

When the dummy coupling member is disconnected from the opposing coupling member subsea, seawater pressure acting on the back face of the piston tends to urge the piston to decrease the volume of the water displacement expansion chamber, thus allowing the trapped seawater and/or air to prevent a vacuum in the receiving chamber. The piston decreases the size of the water displacement expansion chamber until it reaches the volume required for a pressure equilibrium.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

Dummy coupling member 10 according to a first preferred embodiment of the present invention has first end 12 and second end 13, and receiving chamber 11 for receiving the opposing male coupling member therein. The male member (not shown) typically is positioned on the subsea floor and in some instances faces upwardly from the subsea floor so that the leading face of the male coupling member faces upwardly. The male coupling members are commonly attached to a manifold plate using various means, such as set screws or threads, and the female coupling members often are attached to an opposing manifold plate. Techniques for attaching hydraulic coupling members to manifold plates are well known to those skilled in the art.

Figure 1:
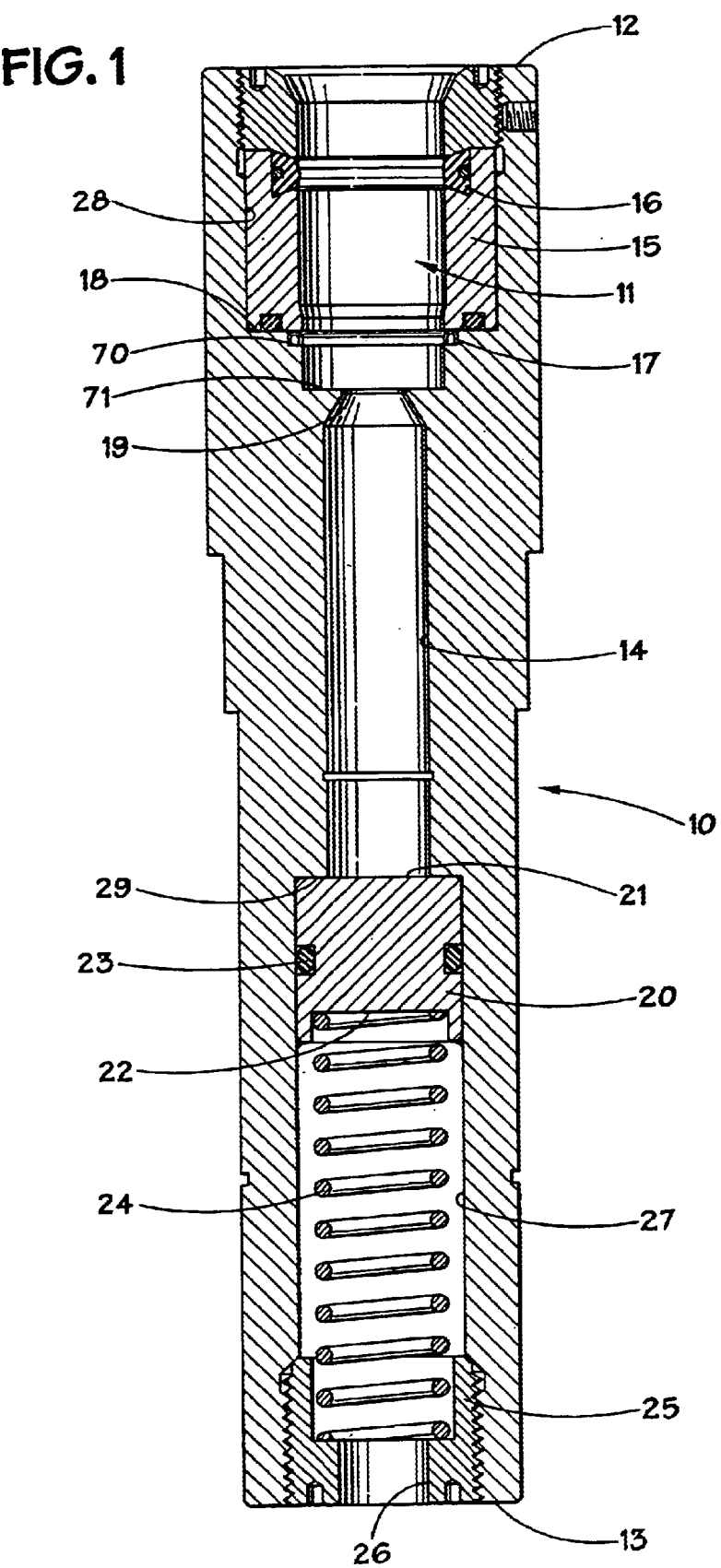
FIG. 1 is a section view of a dummy female coupling member according to a first preferred embodiment of the present invention.

The receiving chamber of the dummy female coupling member may have one or more seals therein for engaging and sealing with the male member. In the embodiment of FIG. 1, the dummy female coupling member includes a pressure-energized annular metal seal 17 that is retained on shoulder surface 70 by retainer 15. The retainer may be a sleeve-shaped body threaded to the female member. Or the retainer may be a two piece retainer with one piece having a sliding interfit with cylindrical wall 28 of the receiving chamber and inserted into the receiving chamber until it abuts internal shoulder 18, and a second piece threaded to the wall of the receiving chamber. Elastomeric seal 16 may be positioned between the two pieces. The elastomeric seal, in a preferred embodiment, has a dovetail interfit with the two-piece retainer. The receiving chamber terminates at internal shoulder 70.

Adjacent the receiving chamber is the first section 14 and second section 27 of the water displacement expansion chamber. Although the water displacement expansion chamber in the embodiment of FIG. 1 is shown having a first section with a smaller diameter and a second section with a larger diameter, the present invention also contemplates that the chamber will have a single uniform diameter, or more than two diameters if desired. In the embodiment of FIG. 1, the first section of the water displacement expansion chamber has inclined shoulder 19.

In FIG. 1, piston 20 is positioned in the second section of the water displacement expansion chamber, and abuts internal shoulder 29 absent significantly higher water or air pressure acting on front face 21 of the piston. Spring 24 urges the piston against shoulder 29. Spring 24 is anchored by collar 25 which may be threaded or otherwise engaged to the second section of the water displacement expansion chamber adjacent second end 13 of the dummy female coupling member. The collar is a sleeve-shaped member having internal bore 26 therethrough to allow entry of water into the second section of the water displacement expansion chamber and exert pressure against rear face 22 of the piston. The piston which slides longitudinally in the water displacement expansion chamber should provide a sliding seal with the walls of the chamber, and in the embodiment of FIG. 1, annular seal 23 is shown to provide such a seal.

When the dummy coupling female coupling member is connected to an opposing coupling member subsea, water and/or air in receiving chamber 11 is forced from the receiving chamber into first section 14 of the water displacement expansion chamber. The additional water and/or air pressure acting on front face 21 of piston 20 will urge the piston towards second end 13, expanding the water displacement expansion chamber until it has sufficient volume. The piston continues to expand the water displacement expansion chamber until the pressure of water and/or air acting on the front face of the piston is balanced to the pressure of seawater and spring 24 acting on rear face 22. In a preferred embodiment, the diameter of the piston is the same or substantially the same as the diameter of the male member entering the receiving chamber, to balance the pressure during connection and disconnection of the male member with the dummy female coupling member.

When the dummy coupling member is disconnected from the opposing coupling member, a vacuum is created in the receiving chamber and the water and/or air in the water displacement expansion chamber will fill that void and avoid hydraulic lock. This results from seawater pressure acting on the rear face of the piston exceeding the pressure acting on its front face. The piston then moves toward the first end of the dummy coupling member, until the pressure is equalized.

Figure 2:
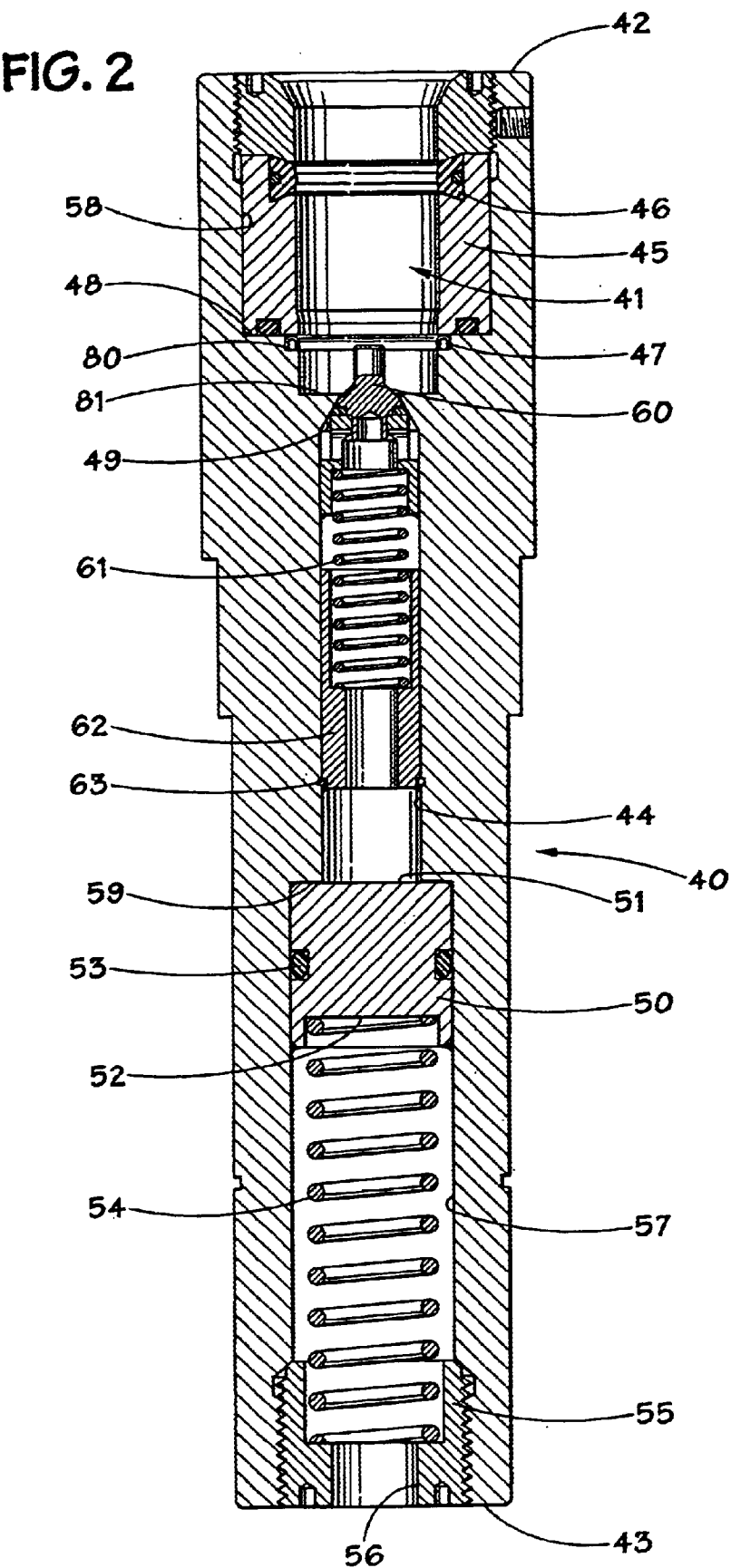
FIG. 2 is a section view of a dummy female coupling member according to a second preferred embodiment of the present invention.

Now referring to FIG. 2, a second preferred embodiment is shown with dummy female coupling member 40 having first end 42, second end 43 and receiving chamber 41 for connection to a male coupling member. Retainer 45 is engaged to the dummy female coupling member adjacent the first end for retaining annular metal seal 47 on shoulder 80. Retainer may be a one-piece or two piece retainer having a first piece in sliding engagement with receiving chamber wall 58 until it abuts shoulder 48. Elastomeric seal 47 is held between the two pieces of the retainer. The receiving chamber terminates at shoulder 81.

In the embodiment of FIG. 2, poppet valve 60 is provided in first section 44 of the water displacement expansion chamber. The poppet valve is urged by valve spring 61 into the closed position against inclined shoulder 49. The valve spring is held by collar 62 and collar clip 63 engages the wall of the first section of the water displacement expansion chamber. In this embodiment, when the dummy female coupling member is connected to the male member, water and/or air in the receiving chamber exerts pressure against poppet valve 60 to urge the poppet valve open, entering the water displacement expansion chamber.

Still referring to FIG. 2, piston 50 slides in second section 57 of the water displacement expansion chamber. Spring 54 urges front face 51 of the piston towards shoulder 59. The piston moves in sliding relationship with cylindrical wall 57 and has annular seal 53 to seal with the wall. The spring is anchored by collar 55 adjacent second end 43 of the dummy coupling member. Seawater entering through bore 56 in collar 55 acts against rear face 52 of the piston, until the pressure on each side of the piston is balanced.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A dummy undersea hydraulic coupling member comprising:
    (a) a receiving chamber dimensioned to receive an opposing coupling member, the receiving chamber interconnected to a water displacement chamber having an internal volume greater than the receiving chamber; and
    (b) a piston positioned in the water displacement chamber, the piston having a front face and a rear face, the piston slideable in response to pressure acting against the front face and rear face to allow fluid and/or gas to move between the receiving chamber and the water displacement expansion chamber, and a seal between the piston and the water displacement expansion chamber to block fluid flow through the dummy undersea hydraulic coupling member.

2. The dummy undersea hydraulic coupling member of claim 1 wherein the water displacement expansion chamber has a first section and a second section, the first section having a smaller diameter than the second section.

3. The dummy undersea hydraulic coupling member of claim 1 further comprising a spring configured to exert pressure against the rear face of the piston.

4. The dummy undersea hydraulic coupling member of claim 1 wherein the seal between the piston and the water displacement expansion chamber is a ring-shaped elastomeric seal.

5. The dummy undersea hydraulic coupling member of claim 1 further comprising a normally closed poppet valve in the water displacement expansion chamber, the poppet valve blocking water and/or air from moving between the receiving chamber and the water displacement expansion chamber in the closed position, the poppet valve openable in response to water and/or air pressure acting thereon.

6. A dummy undersea hydraulic coupling member comprising a body with a stepped internal bore extending therethrough from a first end to a second end thereof, the bore comprising a receiving chamber adjacent the first end and a water displacement expansion chamber adjacent the second end, a piston slideable in the water displacement expansion chamber, the piston having a front face facing the first end of the bore and a rear face facing the second end of the bore, the piston slideable in response to fluid and/or gas pressure acting against the front face and rear face thereof to allow fluid and/or air gas from the receiving chamber to enter or exit the water displacement chamber, and a seal between the piston and the water displacement expansion chamber to block fluid flow through the dummy undersea hydraulic coupling member.

* * * * *